Figure 1:
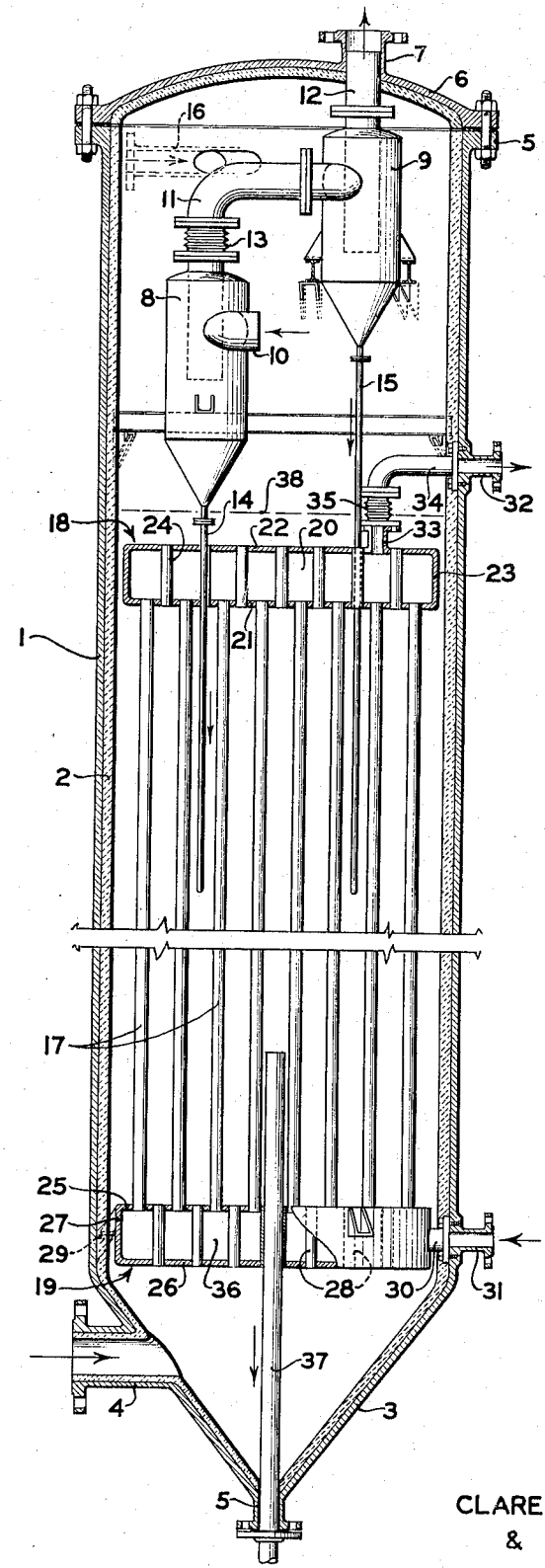

Feb. 12, 1946.   C. G. GERHOLD ET AL   2,394,680
REGENERATION OF SPENT CATALYST
Filed June 30, 1941   2 Sheets-Sheet 1

INVENTORS
CLARENCE G. GERHOLD
& LEV A. MEKLER
BY
ATTORNEY

Patented Feb. 12, 1946

2,394,680

UNITED STATES PATENT OFFICE 2,394,680

REGENERATION OF SPENT CATALYST

Clarence G. Gerhold and Lev A. Mekler, Chicago, Ill., assignors to Universal Oil Products Company, Chicago, Ill., a corporation of Delaware Application June 30, 1941, Serial No. 400,552

3 Claims. (Cl. 252—242)

The invention is directed to an improved method of regenerating finely divided, solid contact material, the catalytic activity of which has become spent or depleted by the deposition thereon of deleterious combustible materials. The invention will be found particularly useful and advantageous in the regeneration of catalyst of the solid granular type employed in promoting hydrocarbon conversion reactions, such as catalytic cracking, catalytic dehydrogenation and the like.

In the regeneration of catalyst of the type above mentioned, it is common practice to burn the deleterious carbonaceous or hydrocarbonaceous deposits therefrom in a stream of air or other oxygen-containing gases and the present invention provides an improved method and means of continuously regenerating solid granular catalytic material in this general manner. Heretofore, continuous catalyst regeneration by burning or oxidation of the deleterious deposits has been accomplished by introducing the catalyst, which is usually in finely divided or pulverulent form, into a stream of air or other oxidizing gas entering the lower portion of a substantially vertical, elongated regenerating zone, these materials being mixed at a temperature sufficiently high to initiate combustion of the deleterious hydrocarbonaceous deposits on the catalyst and the mixture being passed upwardly through the regenerating zone wherein combustion of the deleterious deposits is completed and from the upper portion of which the resulting combustion products and regenerated catalyst are supplied to suitable separating and recovery equipment. In such an operation, the usual combustion products, consisting largely of carbon dioxide with some water (in the form of steam) and a relatively small amount of carbon monoxide, are produced and, except for the available heat which they contain, are waste products.

The process provided by the invention differs from the conventional type of operation, above outlined, to a marked degree and in an advantageous manner in that the catalyst particles to be regenerated and the regenerating gases pass countercurrently through the zone of regeneration. In this improved operation the catalyst first comes in contact with hot combustion products in the upper portion of the regenerating zone and a considerable quantity of vaporizable hydrocarbons in the deleterious material deposited on the catalyst is thus vaporized therefrom rather than being immediately subjected to oxidizing conditions. Furthermore, some of the carbonaceous material in the catalyst deposits combine with carbon dioxide in the combustion gases forming carbon monoxide in accordance with the well known reaction. Thus, the deleterious deposits to be subsequently removed from the catalyst by combustion thereof in air in a lower portion of the regenerating zone is materially reduced so that a smaller quantity of air is required for regeneration. Furthermore, the outgoing combustion gases from the regenerating zone are enriched with substantial quantities of hydrocarbon vapors or gases and carbon monoxide. The presence of substantial quantities of these combustible materials in the exit gases from the regenerating zone render them suitable for use as fuel. Thus, their value is increased over and above that which is predicated on their high temperature and the sensible heat available therefrom.

The mixture of combustion products, catalyst, carbon monoxide and gaseous hydrocarbons prevailing in the upper portion of the regenerating zone is passed, in accordance with the features of the invention, through suitable recovery equipment, such as, for example, one or more cyclone separators, preferably disposed within the shell of the vessel in which regeneration is accomplished, and the catalyst particles are thus separated from the gases. As a special feature of the invention, the catalyst particles from the separating equipment are directed downwardly therefrom into contact with the oxidizing gases employed for regeneration at an intermediate point in the regenerating zone, wherein the remaining deleterious deposits are burned from the catalyst particles, the thus regenerated catalyst gravitating to a lower point in the regeneration zone from which it is removed to suitable storage equipment or the like or from which it may be supplied to the zone in which it serves to promote the hydrocarbon conversion reaction. Since the catalyst in the mixture entering the recovery equipment in the upper portion of the regenerating zone will, in the present process, include a considerable quantity of both partially and completely regenerated catalyst, the mode of operation provided and herein outlined sets up a local cycle of this material within the regenerating zone, whereby the contaminated catalyst from the separating equipment, which is contacted with the oxidizing gas stream, is diluted with catalyst containing little or no combustible deposits so the temperature rise in the regenerating zone is less pronounced. This, in conjunction with vaporization from the catalyst particles of some of the hydrocarbons, in the manner previously explained, and in conjunction with the smaller quantity of air required to complete the regeneration, greatly facilitates the operation and reduces the danger of overheating the catalyst, overheating being a common cause of destruction or permanent impairment to the activity of most catalysts employed in promoting hydrocarbon conversion reactions, such as cracking, dehydrogenation, etc.

Another feature of the invention resides in the provisions for abstracting excess heat from the regenerating zone, this being accomplished in the preferred embodiment of the invention by passing steam in indirect heat transfer relation with the regenerating gases and the catalyst undergoing regeneration in the combustion zone of the regenerating vessel. Other suitable heat transfer media may, of course, be employed instead of the steam without departing from the scope of the invention, such other materials including, for example, suitable molten metals, molten salts, as well as normally liquid, vaporous or gaseous materials. When steam or other vaporous or gaseous medium is employed as the convective fluid for abstracting heat from the regenerating zone, it is preferably maintained under sufficiently high pressure to give it a density at which good heat transfer rates are obtained. In the case of steam, this pressure is preferably of the order of 500 pounds or more, superatmospheric. In the preferred embodiment of the invention, the superheated steam discharged from the heat transfer equipment in the regenerating zone is directed in the form of a suitable spray into a body of water maintained in an unheated pressure vessel exterior to the regenerator, the superheated steam serving to generate steam from the water and a portion of the thus generated steam being recycled to the heat exchange equipment in the regenerator. The remaining portion may be used for any desired purpose.

Due to the hindered settling of catalyst particles in the regenerator, resulting from their tendency to gravitate to the lower portion of this zone, counteracted, in part, by the lifting action of the ascending regenerating gas stream, a relatively turbulent local cycle of catalyst particles will be set up in that portion of the regenerator extending from the point of introduction of the regenerating gas to a higher point, the level of which will depend upon a number of factors including the velocity of the entering regenerating gases, and the height of the regenerating vessel. This is a well known phenomenon and results in what is known as a dense lower phase, wherein the concentration of catalyst particles is relatively high due to their hindered settling, and a less dense upper phase wherein the concentration of catalyst particles is much lower. There is a meniscus or relatively sharp line of demarcation between these phases and, in the present invention, this division roughly corresponds to the division between the combustion zone and the vaporizing zone. Thus the catalyst to be regenerated is supplied to the upper phase of relatively low density and catalyst particles separated from the spent regenerating gases are returned from the separating equipment to the high density zone. When heat exchange means is employed for controlling the temperature in the combustion zone the heat exchange elements are preferably confined to the dense phase, so that the vaporization of hydrocarbons from the catalyst particles in the less dense upper phase is not hampered.

The features and advantages of the invention will be more apparent with reference to the accompanying diagrammatic drawings and the following description thereof.

Fig. 1 of the drawings is a cross-sectional elevation of a catalyst regenerator embodying the features of the invention.

Figure 2:
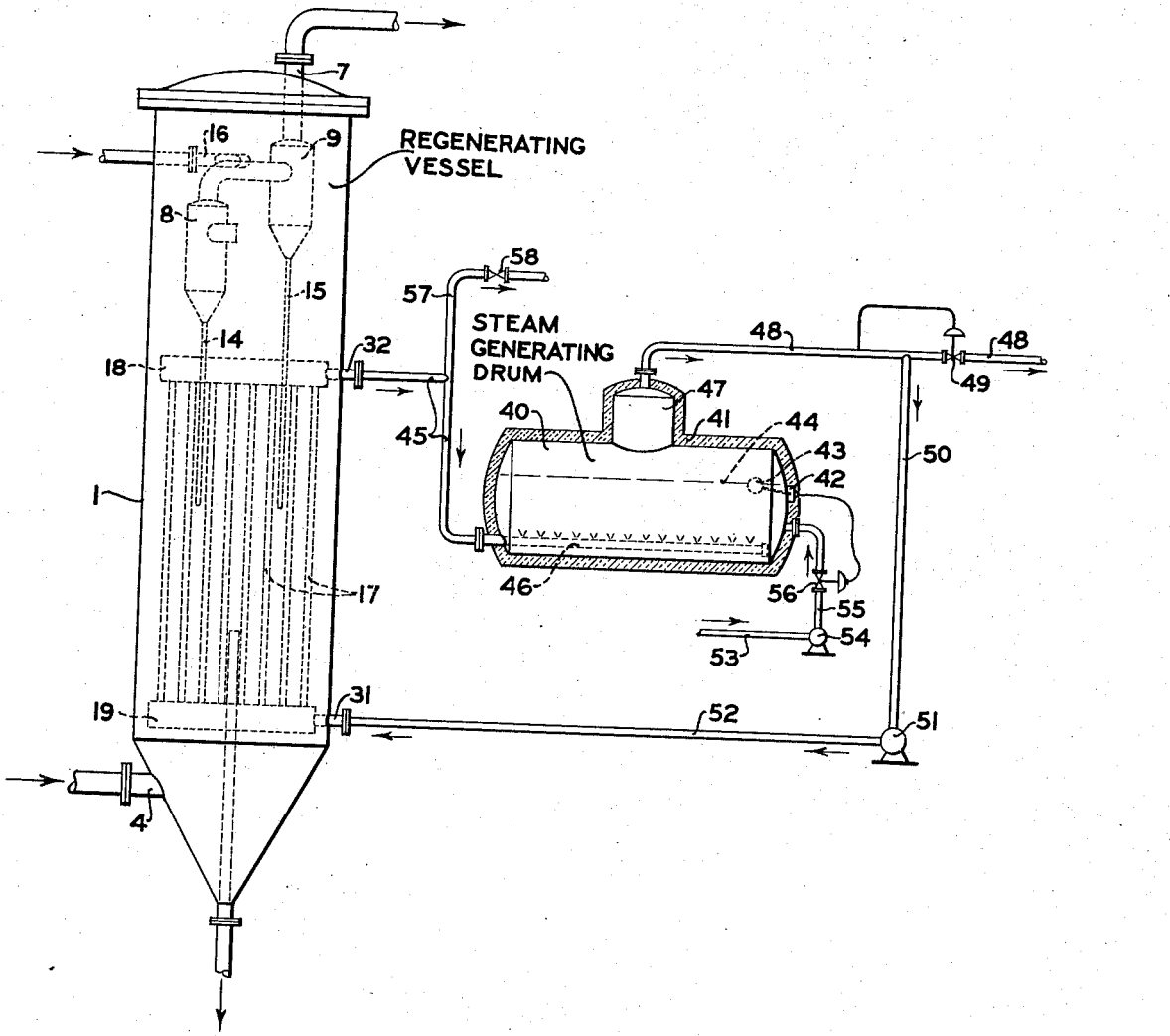

Fig. 2 is an elevational view of a catalyst regenerator, such as shown in Fig. 1, connected with a steam generator as provided by the invention.

In the two figures, corresponding portions of the apparatus are designated by the same reference numerals.

Referring to the drawings, the regenerating chamber comprises an outer cylindrical shell 1, preferably lined with suitable insulating and refractory material 2 of any suitable type. The shell is provided, in the case here illustrated, with a conical bottom 3 to which inlet nozzle 4 for regenerating gases and outlet nozzle 5 for regenerated catalyst are secured and the upper end of the shell is flanged, as indicated at 5' and provided with a removable upper head 6 bolted to flange 5' and having outlet nozzle 7 secured thereto.

The approximate meniscus or division between the dense lower phase and less dense upper phase in the regenerator is indicated by the broken line 38 and two centrifugal or "cyclone" type separators 8 and 9 are disposed within this upper phase and supported as illustrated from shell 1. The separators are connected in series by conduit 11, the inlet to separator 8 being from the space about the separators within the upper portion of shell 1 through conduit 10 and the outlet from separator 9 being through conduit 12 which is closely fitted to and slidably engaged with the interior of nozzle 7 in order to accommodate differential longitudinal expansion and contraction between separator 9 and the shell of the regenerator. Another suitable expansion joint 13 in conduit 11 accommodates differential expansion and contraction in the two separators and differential expansion and contraction in the separators and the shell between the points on the shell from which the separators are supported.

It will, of course, be understood that the separators may, when desired, be disposed exterior to shell 1, but since they operate under pressure, their disposition within the shell, as illustrated, where superatmospheric pressure prevails about as well as within the separators, permits lighter construction of the latter.

The function of separators 8 and 9 is to remove catalyst particles from the gases to be discharged from the regenerating zone, this being accomplished in the case of the cyclone separators here illustrated by the centrifugal force of the gases passing therethrough which throws the catalyst particles against the outer shell of the separators. The thus separated catalyst particles fall to the conical bottom sections of the separators from which they are discharged through the respective tail pipes 14 and 15 into an intermediate zone of the regenerator wherein they contact an ascending stream of hot oxidizing gases supplied to the regenerator through nozzle 4.

The catalyst to be regenerated is supplied either alone or in admixture with regulated quantities of fresh or regenerated catalyst through nozzle 16 mounted tangentially on shell 1 into the space within the latter about separators 8 and 9 wherein it mixes with the hot regenerating gases, the oxygen content of which has been largely consumed in the lower portion of the regenerator, and with that quantity of the regenerated catalyst particles carried upward to this zone in the stream of regenerating gases. By contact of the contaminated catalyst particles supplied to the regenerator through nozzle 16 with hot, low oxygen-containing regenerating gases in the upper portion of shell 1, a considerable quantity of the vaporizable constituents of the hydrocarbonaceous deposits on the catalyst will be removed therefrom by vaporization and, at the temperatures prevailing in this zone, normally liquid constituents of these deposits will be cracked, as well as vaporized, and thereby largely converted to gas and coke. In addition, some of the carbonaceous deposits will unite with carbon dioxide in the regenerating gas stream or, more strictly speaking, in the combustion gases resulting from the oxidizing reaction in the lower portion of the regenerating zone, to form carbon monoxide. Thus, the material supplied to the separating equipment consists largely of a mixture of gases, including hydrocarbons, carbon monoxide, carbon dioxide and steam with regenerated and partially regenerated catalyst particles. The gases leaving separator 9 and the regenerator through nozzle 7 are substantially entirely free of catalyst particles and it will, of course, be understood that any desired number of separators for accomplishing this may be employed within the scope of the invention and that, when desired, other forms of separating equipment, such as, for example, an electrical precipitator may be substituted for the centrifugal type illustrated. We specifically contemplate the use of an electrical precipitator, when desired, in the final separating step.

A substantial portion of the catalyst supplied to the reactivator through nozzle 16, and particularly the heavier catalyst particles, will descend from the upper zone of the regenerator to which the catalyst is supplied into the lower oxidizing or combustion zone countercurrent to the ascending stream of regenerating gases. Regenerated catalyst resulting from combustion of the carbonaceous deposits and including catalyst supplied to the oxidizing or combustion zone from separators 8 and 9, as above described, will descend, in part, to a lower point in the regenerator from which catalyst particles are removed to suitable storage equipment or elsewhere, as desired, through conduit 37 and nozzle 5. Another portion of the regenerated catalyst particles will be carried upward with the stream or ascending gases to reenter the separators and be returned therefrom through tail pipes 14 and 15 to a lower zone, thus setting up a local cycle of reactivated catalyst which serves to dilute the contaminated catalyst undergoing regeneration. This dilution serves to assist in preventing the development of excessive temperatures which would damage the catalyst. This dilution effect may be increased to the desired degree by returning regulated quantities of regenerated catalyst to the equipment through nozzle 16 in admixture with contaminated catalyst to be regenerated.

In addition to the manner and means above mentioned of retarding the development of excessive temperature in the regenerator, the invention provides a method and means of abstracting excess heat from the regenerating zone by passing a convective fluid therethrough in indirect heat transfer relation with the regenerating gases and the catalyst undergoing regeneration. This is accomplished, in the case illustrated, by providing a tubular heat exchanger of special form within the combustion zone or dense phase in the regenerator wherein excessive temperatures might otherwise be encountered. The heat exchanger illustrated comprises a nest of elongated tubular fluid conduits 17 extending between and secured to upper and lower headers 18 and 19, respectively, and establishing communication between the respective header compartments 20 and 36 defined by these headers. Header 18 is a relatively flat cylindrical shape comprising tube sheet 21, a relatively flat upper sheet or head 22 and cylindrical wall 23. Spaced tubular members 24 extending between and secured to plates 21 and 22, serve as stiffening stays for the latter and, in addition, serve as conduits through which catalyst and regenerating gases pass through the headers. Header 19 is similar to 18 and comprises tube sheet 25, head 26 and the cylindrical wall 27 with tubular members 28, similar to members 24 of header 18, extending between and secured to sheets 25 and 26 and serving as stays and as conduits for the regenerating gases and catalyst.

The heat exchanger assembly, in the case illustrated, is supported from shell 1 on spaced lugs disposed about the latter which engage space lugs disposed about the periphery of header 19, one pair of such supporting lugs being illustrated at 29. A nozzle 30 on header 19, which may serve as either an inlet or as an outlet connection to compartment 36, is releasably secured to shell 1 and communicates with nozzle 31 on the shell. Another nozzle 32, similar to nozzle 31, is provided on shell 1 above header 18 and communicates with the latter and with compartment 20 thereof through nozzle 33 on header 18 and conduit 34, which latter is releasably secured to shell 1 at nozzle 32 and to nozzle 33. A suitable expansion joint 35 is provided in conduit 34 which permits free movement of header 18 upon longitudinal expansion and contraction of tubes 17 and accommodates differential expansion and contraction between the heat exchanger assembly and shell 1.

The heat exchanger, separators 8 and 9, supporting means for the heat exchanger and separators and the connections between the headers of the heat exchanger and shell 1 are so constructed and arranged, as illustrated, that after removing head 6 from the cylindrical shell, the separators and the heat exchanger may be disconnected from the shell and removed therefrom.

Referring now particularly to Fig. 2, which illustrates the catalyst regenerator shown in Fig. 1 connected with equipment for the generation of steam for use in controlling the temperature in the combustion zone of the regenerator, steam generating drum 40, which is preferably insulated externally as indicated at 41, is supplied with water from any suitable source through line 53, pump 54, line 55 and valve 56 and, in the case illustrated, a liquid level controller 42, having a float 43 and connected with valve 56, controls the setting of this valve to maintain a substantially constant predetermined level of liquid in drum 40, as indicated at 44.

To generate steam from the water in drum 40, superheated steam from the tubular heat exchanger disposed within shell 1 of the regenerator and previously described in conjunction with Fig. 1, is supplied through line 45 to drum 40. Line 45 preferably terminates in a suitable spray pipe or the like 46 disposed beneath the liquid level maintained in the drum. Sensible heat in the high temperature steam from the heat exchanger within the regenerator is thus employed to generate more steam from the water in drum 40 and the steam removed from the dome 47 of the latter through line 48 is at a considerably lower temperature level than that supplied to the drum from line 45. Its temperature is controlled by the pressure maintained in drum 40 which, in turn, is regulated by back pressure valve 49 in line 48 through which the excess steam produced in the system is discharged for use in any desired manner. That quantity of steam required to accomplish the desired cooling in the combustion zone of the reactivator is directed from line 48 through line 50, which is connected therewith on the up stream side of valve 49, to pump or compressor 51 by means of which it is supplied through line 52 to the heat exchanger. In passing through the heat exchanger the steam is further heated and abstracts the excess heat from the hot regenerating gases and catalyst in the combustion zone of the regenerator. Thus, a cyclic flow of steam is established through the heat exchanger and the steam generating equipment, the steam serving as a cooling medium in the heat exchanger and as a heating medium in the steam generator so that excess heat from the catalyst regenerating zone is employed to generate steam which may be conveniently employed, when desired, for operating pump 54 or compressor 51, or both, and which will ordinarily be generated in sufficient quantities that additional steam will be available for use in other portions of the process, such as, for example, to preheat the hydrocarbons to be contacted with the regenerated catalyst, to operate the charging pump for the conversion process or otherwise in any desired manner. When desired all or any portion of the excess superheated steam may be removed from the system through line 57 communicating with line 45 and controlled by valve 58.

It will, of course, be apparent that other media than water may be employed, when desired, as the convective fluid in an apparatus such as illustrated in Fig. 1. Materials suitable for accomplishing the desired purpose in the heat exchanger may be selected to suit requirements from a wide variety of substances, such as, for example, various salts, preferably in the form of eutectic mixtures, eutectic mixtures of diphenyl and diphenyl oxide, low melting metals and the like.

It will also be apparent that other means of cooling the convective fluid employed to abstract excess heat in the combustion zone of the regenerator may be used in place of the steam regenerating system illustrated in Fig. 2. The invention also contemplates a regenerator of the type illustrated in Fig. 1 with the heat exchanger eliminated therefrom, in which case the concentration of regenerated and partially regenerated catalyst is maintained sufficiently high in the combustion zone of the regenerator to obviate the necessity for employing an external convective fluid as a cooling medium in this zone.

We claim as our invention:

1. A process for regenerating finely divided solid catalyst containing hydrocarbonaceous deposits, which comprises maintaining a turbulent bed of finely divided carbonized catalyst in a regenerating chamber and passing an oxidizing gas upwardly through said bed to burn carbonaceous matter from the catalyst, removing regenerated catalyst from the lower portion of said bed, maintaining in the regenerating chamber above said bed a zone of relatively low catalyst concentration receiving hot combustion gases resulting from the burning of carbonaceous matter within the catalyst bed, introducing the finely divided catalyst to be regenerated to the upper portion of said zone to descend therethrough to the catalyst bed in countercurrent contact with the ascending combustion gases and vaporizing hydrocarbons from the catalyst in said zone by the heat of the combustion gases, thereby forming a mixture of combustion gases, hydrocarbons and entrained catalyst particles, subjecting said mixture to a separatory treatment to remove catalyst particles therefrom, and introducing thus separated catalyst particles to said bed at an intermediate point in the height thereof substantially below the upper surface of the bed but above the point of withdrawal of said regenerated catalyst from the bed while preventing admixture of said separated particles with the catalyst particles in the upper portion of said bed.

2. The process as defined in claim 1 further characterized in that said mixture is subjected to the separatory treatment within the upper portion of the regenerating chamber above the catalyst bed.

3. The process as defined in claim 1 further characterized in that excess heat of combustion is removed from the regenerating chamber by passing a convective fluid therethrough in indirect heat exchange relation with the catalyst bed maintained therein.

CLARENCE G. GERHOLD.
LEV A. MEKLER.